United States Patent
Dreyer

(10) Patent No.: US 7,641,803 B2
(45) Date of Patent: Jan. 5, 2010

(54) FILTER CARTRIDGES FOR FLUID INTAKE SYSTEMS

(75) Inventor: Harold B. Dreyer, Anchorage, AK (US)

(73) Assignee: Gunderboom, Inc., Anchorage, AK (US)

( * ) Notice: Subject to any disclaimer, the term of this patent is extended or adjusted under 35 U.S.C. 154(b) by 157 days.

(21) Appl. No.: 11/674,078

(22) Filed: Feb. 12, 2007

(65) Prior Publication Data

US 2007/0187318 A1     Aug. 16, 2007

Related U.S. Application Data

(60) Provisional application No. 60/772,172, filed on Feb. 10, 2006.

(51) Int. Cl.
    *C02F 1/74* (2006.01)
(52) U.S. Cl. ............ 210/767; 210/221.2; 210/416.1; 210/483
(58) Field of Classification Search ............ 210/170.02, 210/170.09, 170.11, 170.1, 220, 221.1, 221.2, 210/437, 438, 440, 441, 483, 485, 488, 489, 210/507, 747, 767, 416.1
    See application file for complete search history.

(56) References Cited

U.S. PATENT DOCUMENTS

| 330,145 | A | | 11/1885 | Oldham |
|---|---|---|---|---|
| 1,100,267 | A | * | 6/1914 | Stedman ............ 210/486 |
| 2,249,063 | A | | 7/1941 | Swem |
| 2,568,085 | A | | 9/1951 | Naugle |
| 2,985,307 | A | | 5/1961 | Grasmere et al. |
| 3,023,905 | A | | 3/1962 | McDougal et al. |
| 3,347,383 | A | | 10/1967 | Augerot |
| 3,659,713 | A | | 5/1972 | Mueller |
| 3,713,540 | A | | 1/1973 | Davidson et al. |
| 3,826,372 | A | | 7/1974 | Bell |
| 3,899,424 | A | | 8/1975 | Lake |
| 3,979,289 | A | | 9/1976 | Bykowski et al. |
| 4,178,245 | A | | 12/1979 | Nakaoka et al. |

(Continued)

FOREIGN PATENT DOCUMENTS

FR    2 195 238    3/1974

(Continued)

OTHER PUBLICATIONS

International Search Report in related PCT Application PCT/US07/061998.

*Primary Examiner*—Fred Prince
(74) *Attorney, Agent, or Firm*—Nixon Peabody LLP

(57) ABSTRACT

A filter cartridge including a frame that is formed of one or more fluid conductive members and has a fluid outlet and a plurality of spaced inlets; and a flexible fabric material that allows the flow of water therethrough, the flexible fabric material being connected to the frame in a manner defining an internal zone, whereby substantially all fluid entering the internal zone from an opposite side of the flexible fabric material passes therethrough; wherein, upon connection of the fluid outlet to a fluid intake system, fluid is drawn through the flexible fabric material into the internal zone, thereby filtering the fluid, and filtered fluid is drawn through the plurality of spaced inlets and passes to the fluid outlet for delivery into the fluid intake system. A system and method for filtering fluid intake are disclosed.

28 Claims, 8 Drawing Sheets

U.S. PATENT DOCUMENTS

| | | | |
|---|---|---|---|
| 4,218,322 A | | 8/1980 | Kojima |
| 4,219,423 A | | 8/1980 | Smith, Jr. |
| 4,285,821 A | | 8/1981 | Hiesinger et al. |
| 4,288,321 A | | 9/1981 | Beane |
| 4,296,884 A | | 10/1981 | Luebke |
| 4,419,232 A | | 12/1983 | Arntyr et al. |
| 4,516,994 A | | 5/1985 | Kocher |
| 4,582,048 A | | 4/1986 | Sorensen |
| 4,669,972 A | | 6/1987 | Koblanski |
| 4,692,059 A | | 9/1987 | Juutilainen |
| 4,749,479 A | | 6/1988 | Gray |
| 4,752,402 A | * | 6/1988 | Gray ......................... 210/747 |
| 4,880,333 A | | 11/1989 | Glasser et al. |
| 4,919,820 A | | 4/1990 | Lafay et al. |
| 4,988,235 A | | 1/1991 | Hurley |
| 5,057,217 A | * | 10/1991 | Lutz et al. ................... 210/346 |
| 5,102,261 A | | 4/1992 | Gunderson, III |
| 5,139,686 A | | 8/1992 | Cares |
| 5,197,821 A | | 3/1993 | Cain et al. |
| 5,220,958 A | | 6/1993 | Bernhardt |
| 5,225,622 A | | 7/1993 | Gettle et al. |
| 5,227,060 A | | 7/1993 | Roy et al. |
| 5,322,629 A | | 6/1994 | Stewart |
| 5,345,741 A | | 9/1994 | Slater et al. |
| 5,354,456 A | | 10/1994 | Montgomery et al. |
| 5,354,459 A | | 10/1994 | Smith |
| 5,372,711 A | | 12/1994 | Sill |
| 5,394,786 A | | 3/1995 | Gettle et al. |
| 5,427,679 A | | 6/1995 | Daniels |
| 5,471,034 A | | 11/1995 | Kawate et al. |
| 5,558,462 A | | 9/1996 | O'Haver |
| RE36,297 E | | 9/1999 | Heino et al. |
| 5,980,740 A | | 11/1999 | Harms et al. |
| 5,992,104 A | | 11/1999 | Hudak |
| 6,337,025 B1 | | 1/2002 | Clemenson |
| 6,485,229 B1 | | 11/2002 | Gunderson, III et al. |
| 6,488,846 B1 | | 12/2002 | Marangi |
| 6,598,580 B2 | | 7/2003 | Baumann et al. |
| 6,660,170 B2 | | 12/2003 | Dreyer et al. |
| 6,843,924 B2 | | 1/2005 | Dreyer et al. |
| 7,338,607 B2 | * | 3/2008 | Dreyer et al. ............... 210/767 |
| 2002/0080681 A1 | | 6/2002 | Dreyer et al. |
| 2003/0010704 A1 | | 1/2003 | Claypoole et al. |
| 2003/0089658 A1 | | 5/2003 | Dreyer et al. |

FOREIGN PATENT DOCUMENTS

| | | |
|---|---|---|
| FR | 2 284 709 A1 | 4/1976 |
| FR | 2 329 808 A1 | 5/1977 |
| FR | 2 579 239 A1 | 9/1986 |
| GB | 2246981 A | 2/1992 |
| WO | WO91/07546 A1 | 5/1991 |
| WO | WO99/19570 A1 | 4/1999 |

* cited by examiner

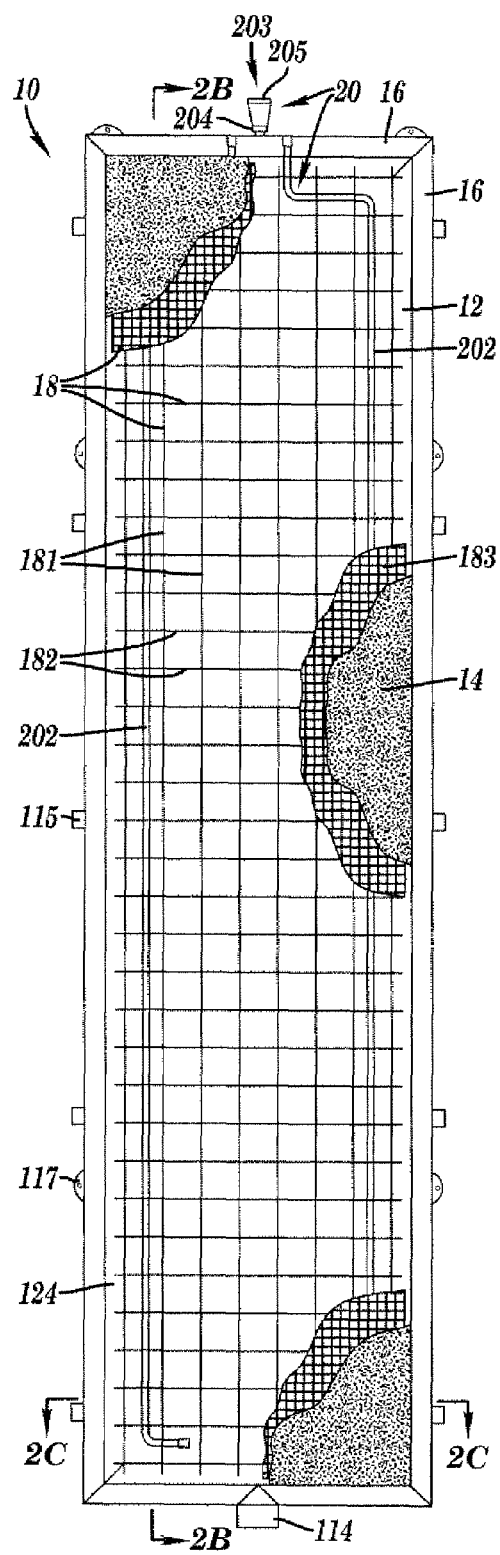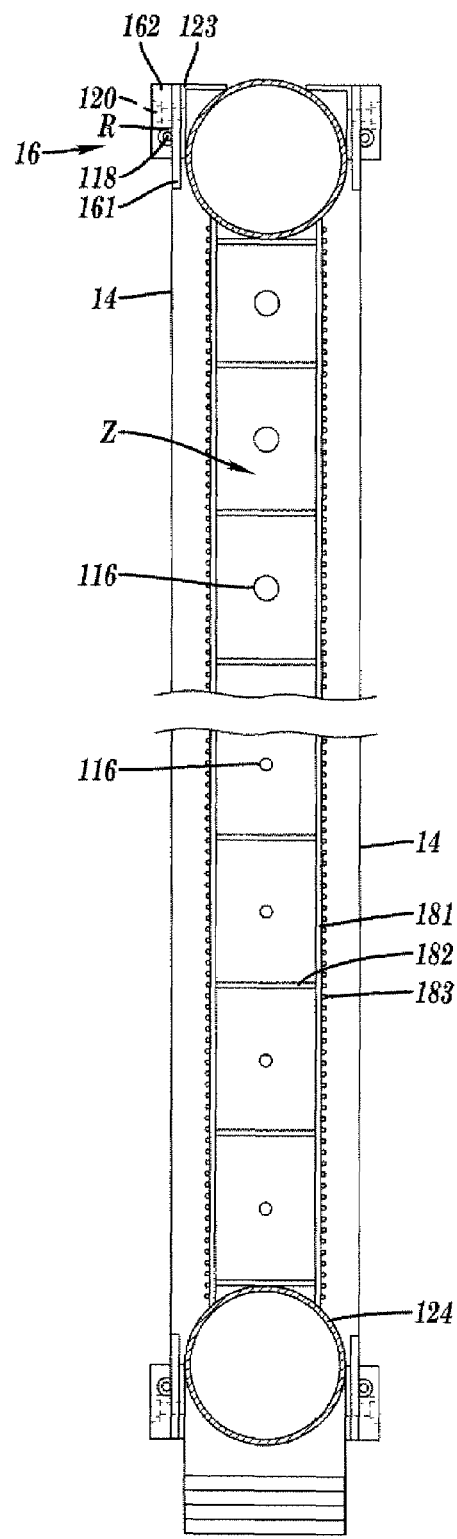
*FIG. 2A*  *FIG. 2B*

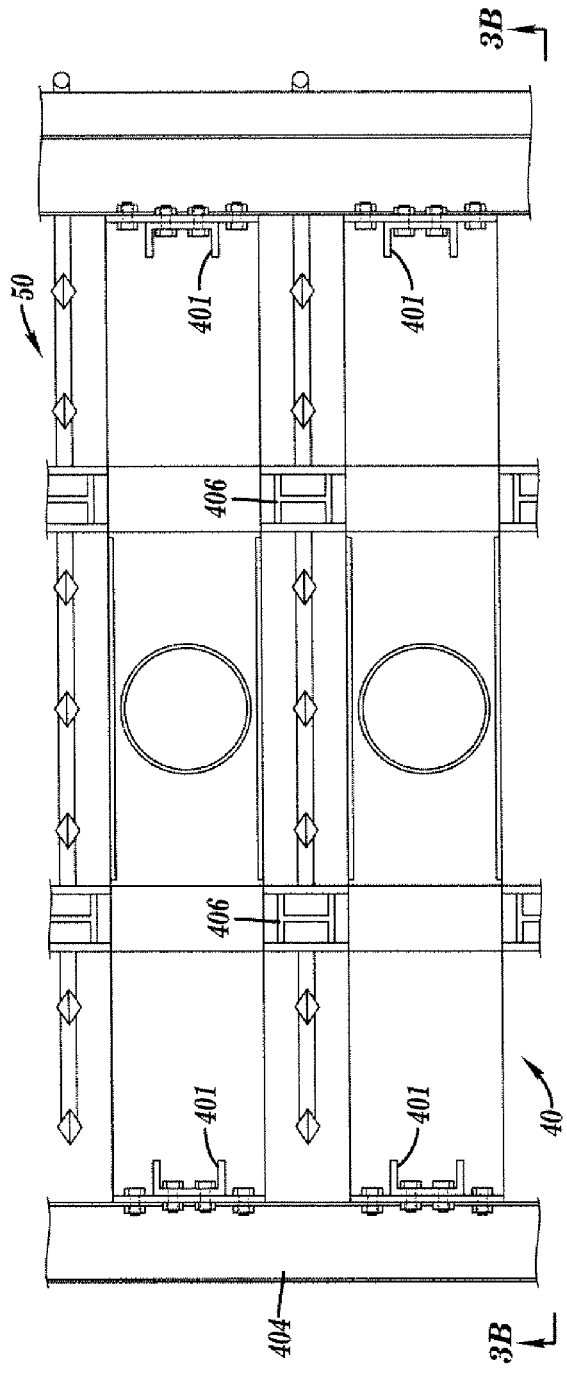
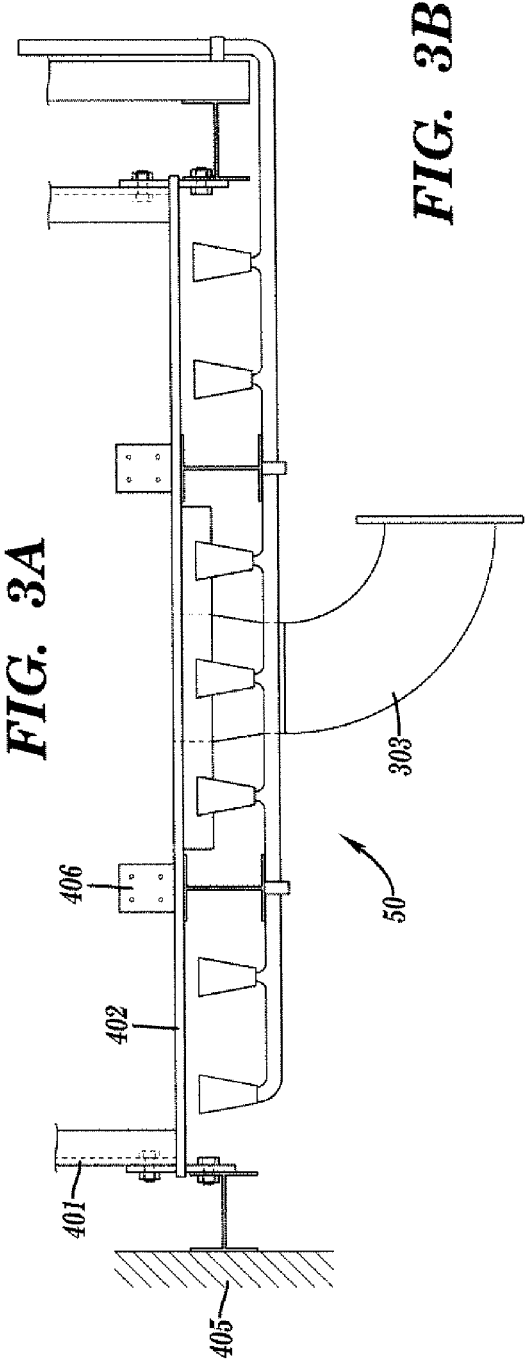
FIG. 3A
FIG. 3B

FILTER CARTRIDGES FOR FLUID INTAKE SYSTEMS

This application claims the benefit of U.S. Provisional Patent Application Ser. No. 60/772,172, filed Feb. 10, 2006, which is hereby incorporated by reference in its entirety.

FIELD OF THE INVENTION

The present invention relates to a method and apparatus for excluding suspended particulates and/or aquatic life from entrainment within, e.g., a cooling system water intake site of a facility using industrial water.

BACKGROUND OF THE INVENTION

Industrial plants and power plants utilize water from nearby water sources for cooling purposes. Aquatic life (e.g., fish, fish eggs, larvae, zebra mussels, vegetation, etc.) in the surrounding water body is often negatively impacted by entrainment within the cooling system water intakes. Cooling systems are also negatively impacted by the entrainment of sediments and debris from the surrounding water body. Entrained contaminants within the cooling systems can result in system failures due to damaged components and costly shut-downs for frequent maintenance and/or repairs.

Floating barrier or containment/exclusion boom systems have been installed at these water intakes to deal with these problems. These boom systems are optimal for some situations, but the size of the system can be a problem when the boom system encroaches upon navigable waters. Thus, it would be desirable to produce an alternative filtration system which avoids this problem.

The large amount of water which has traditionally been diverted by industrial water users has had a significant, negative impact on the aquatic life in the surrounding body of water. The increase in temperature of the water diverted to the cooling system can, upon return to the body of water, raise the temperature of the water, possibly having negative effects upon aquatic life. Recent changes in federal regulations governing industrial water usage mandate a substantial reduction in the amount of water which can be diverted. This lower demand results in a lower flow rate. This decrease in flow rate leads to a decrease in the required amount of filtering area in containment/exclusion barrier systems. It would be advantageous, then, to have a filtering system which would function optimally with the federally mandated changes in water usage for industrial plants and power plants, while avoiding the other problems attendant with such usage. U.S. Patent Application Publication No. 20030089658 to Dreyer et al. (filed Nov. 4, 2002) discloses, inter alia, a filter canister for use in a fluid intake system. The filter canister includes a frame, a sheet of flexible fabric material that allows the flow of water therethrough, and a conduit. The sheet of flexible fabric material is connected to the frame in a manner defining an internal zone whereby substantially all fluid entering the internal zone from an opposite side of the sheet of flexible fabric material passes therethrough. The conduit has a first end located externally of the frame and a second end located within the internal zone defined by the sheet of flexible fabric material. Upon connection of the first end of the conduit to a fluid intake system, fluid is drawn through the sheet of flexible fabric material into the internal zone, thereby filtering the fluid, and filtered fluid is drawn through the second end of the conduit for delivery into the fluid intake system. In operation, however, intake fluid tends to flow non-uniformly through these filter canisters.

The present invention is directed toward overcoming these and other deficiencies.

SUMMARY OF THE INVENTION

A first aspect of the present invention relates to a filter cartridge for use in a fluid intake system. This filter cartridge includes a frame that is formed of one or more fluid conductive members and has a fluid outlet and a plurality of spaced inlets, and a flexible fabric material that allows a flow of fluid therethrough. The sheet of flexible fabric material is connected to the frame in a manner defining an internal zone, whereby substantially all fluid entering the internal zone from an opposite side of the flexible fabric material passes therethrough. Upon connection of the fluid outlet to a fluid intake system, fluid is drawn through the flexible fabric material into the internal zone, thereby filtering the fluid, and filtered fluid is drawn through the plurality of spaced inlets and the one or more fluid conductive members before passing through the fluid outlet for delivery into the fluid intake system.

A second aspect of the present invention relates to a system for filtering fluid intake. This system includes a fluid intake system that has at least one inlet in fluid communication with a fluid intake pump, and at least one filter cartridge of the present invention with the fluid outlet in fluid communication with the at least one inlet.

A third aspect of the present invention relates to a method of filtering water entering a water intake system. This method involves installing a filter cartridge of the present invention into a water intake system with the fluid outlet in fluid communication with an inlet to the water intake system, and drawing water through the water intake system, whereby water entering the water intake system is drawn through the sheet of flexible fabric material into the internal zone, thereby filtering the water, prior to passing through the fluid outlet for delivery into the water intake system.

The filter cartridges and systems of the present invention offer a number of advantages over full length containment/exclusion boom systems. In particular, due to their compact size, the filter cartridges of the present invention are particularly useful for water intake systems that draw from bodies of water close to navigable sections of the water. Due to their compact size and ease of connection to water intake systems, the filter cartridges can be connected to inlets of the water intake system such that an arrangement of multiple filter cartridges will not encroach upon navigable waters, i.e., they can be kept close to the shoreline in shallow waters. This is of significant importance in various industries that employ water-cooling systems, who will be able to utilize the filter cartridges of the present invention to comply with governmental regulations (regarding exclusion of aquatic biota) rather than installing expensive dry cooling towers. The filter cartridges constructed with geosynthetic fabric materials and gas injection cleaning systems allow permanent or semi-permanent installation of the filter cartridges, which can minimize the necessity of shutting down water intake systems for routine cleaning and maintenance. In addition, by using the frame to conduct fluid, it is possible to eliminate the need for separate components of the frame and fluid conducting outlet. This contributes to cost savings over previously-described filter systems of the type disclosed in, e.g., U.S. Patent Application Publication No. 20030089658 to Dreyer et al. (filed Nov. 4, 2002). In addition, the design and construction of the filter cartridge systems allows for fluid to flow more uniformly through the fabric material and into the conductive frame, which improves the overall efficiency of the device and system.

BRIEF DESCRIPTION OF THE DRAWINGS

FIG. 2A is an elevational view of a filter cartridge in accordance with the present invention. The flexible fabric material and the support screen are partially cut away to show a plurality of support ribs, and air burst supply pipes of a gas injection system. A fluid outlet and outlet vent are also visible. FIG. 2B is a cross-sectional, elevational view of a filter cartridge in accordance with the present invention on a line 2B-2B perpendicular to that of FIG. 2A. In this embodiment, a plurality of spaced inlets (located within the internal zone) is shown on the inner face of frame. The frame is connected to a housing member and first and second clamp members.

FIG. 3A is a plan view of a cradle and slot diffuser in accordance with a fluid intake system of the present invention. In this embodiment, one or more filter cartridges of the present invention slide vertically along guide channels into a cradle-type support. FIG. 3B is an elevational view of the bottom of the cradle and slot diffuser along line 3B-3B of FIG. 3A.

DETAILED DESCRIPTION OF THE INVENTION

As shown in the accompanying drawings, the present invention relates to a system designed for filtration of fluid taken up by a fluid intake system and the filter cartridges which are the actual site of filtration in such a system. The fluid to be filtered is preferably water.

The filter cartridges of the present invention are characterized by a frame that is formed of one or more fluid conductive members and has a fluid outlet and a plurality of spaced inlets, and a configuration of flexible fabric material that allows the flow of water therethrough. The flexible fabric material is connected to the frame in a manner such that the flexible fabric material, alone or in combination with the frame, defines an internal zone of the filter cartridge, whereby substantially all water entering the internal zone from an opposite side of the flexible fabric material (i.e., outside the internal zone) passes therethrough. Upon connection of the fluid outlet to a fluid intake system, fluid (e.g., water) is drawn through the flexible fabric material into the internal zone, thereby filtering the fluid, and filtered fluid is drawn through the plurality of spaced inlets and the one or more conductive members before passing through the fluid outlet for delivery into the fluid intake system.

The frame can actually be a single piece or one or more frame members coupled together so as to form one or more continuous paths for fluid flow. For example, portions of the frame within the internal zone may contain the plurality of spaced inlets to more uniformly draw water over the entire or substantially the entire surface area of the flexible fabric material, whereas portions of the frame external thereof should not have inlets. Regardless of the type of frame member used, it is preferred that any connection of the frame passing through the flexible fabric material is sealed to prevent water flow into the internal zone without passage through the flexible fabric material. Suitable gaskets and sealants include, without limitation, rubber, silicone, or cork gaskets or silicone or other sealants.

Figure 1A:
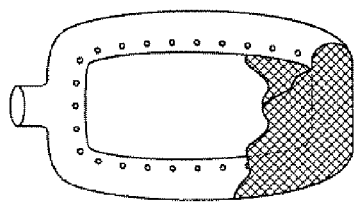
FIGS. 1A-B are elevational views of suitable closed-(1A) and open-(1B) shape frames in accordance with the present invention.
Figure 1A:
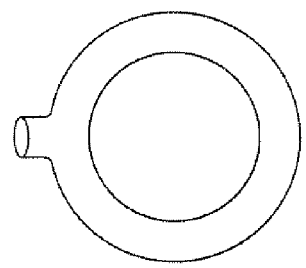
Figure 1A:
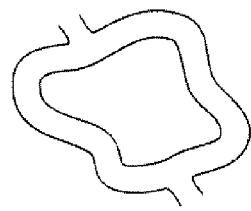
Figure 1A:
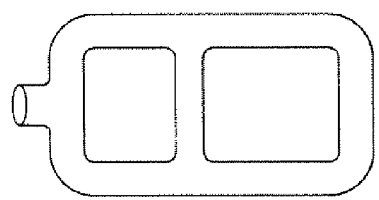
Figure 1B:
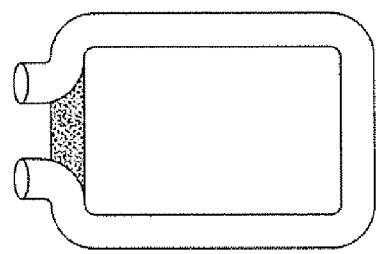
Figure 1B:
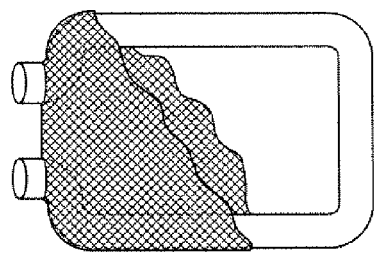
Figure 1B:
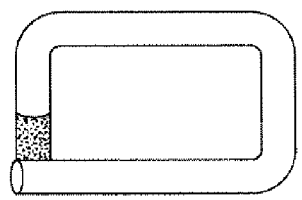
Figure 1B:
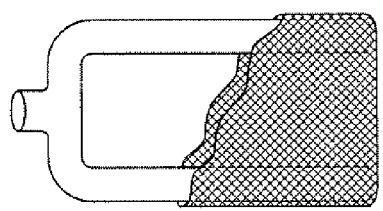

The filter cartridge frame may have, e.g., a closed shape in which case the fluid conductive members are connected such that the entirety of the frame is fluid conductive. In a preferred embodiment, the fluid conductive members form a perimeter of the internal zone. Exemplary closed-shape filter cartridge frames are shown in FIG. 1A. Alternatively, the frame may have an open shape in which the entirety of the frame may or may not be fluid conductive. In the former instance, the frame does not form a closed structure. In the latter instance, the frame has a closed structure but a portion is not fluid conductive. Exemplary open-shape filter cartridge frames are shown in FIG. 1B.

Regardless of the frame embodiment, the filter cartridge should be constructed in such a way that fluid still passes substantially through the flexible fabric material before entering the internal zone. For example, filter cartridge components may be attached to the frame, as should be apparent to one skilled in the art, in a manner to substantially prevent fluid from entering the internal zone without passing through the flexible fabric material. Components that may be attached to the frame in this manner include, for example, one or more non-conductive frame members, the flexible fabric material, one or more retaining components for securing the fabric, and combinations thereof.

The plurality of spaced inlets may be positioned to allow fluid to be drawn substantially uniformly through the flexible fabric material. In one embodiment, the inlets are substantially uniform in size. In another embodiment, the plurality of spaced inlets comprise inlets of varying sizes. For example, the inlets can vary in size according to their relative proximity to the fluid outlet, e.g., inlets positioned further away from the fluid intake may be progressively larger than inlets positioned nearer to the fluid intake. The latter embodiment is preferred, because it promotes the most uniform fluid draw.

The frame can be constructed of any of a variety of suitable materials so long as they tend to resist wear associated with marine environments. Such materials include thermoplastic materials and metals that resist rusting, such as aluminum and stainless steel. Connections between the frame members can be made in any suitable manner and in consideration of the materials that form the frame members. These include welding, soldering, sonic welding, marine adhesives, mechanical connections, etc. Where frame connections are intended to seal two frame members together, and a sealed connection is desired (such that water will not flow through the connection to any significant extent), a sealant may be applied to the connection either before or after the connection is made. For mechanical connections, gaskets or other sealing agents can be used as well.

The flexible fabric material is preferably formed of a geosynthetic fabric, such as a geotextile material. Geosynthetic fabric is "hydrophobic" and "water-pervious," meaning that water passes through the fabric. The hydrophobic property of geosynthetic fabric permits the passage of water current therethrough without the fibers absorbing water and swelling, which would reduce permittivity of the fabric.

Geosynthetic fabrics are commercially available in a range of tensile strengths, permeabilities, and permitivities, and are useful for the purposes of the invention throughout those ranges. Depending upon the environmental, current conditions, anticipated load requirements, turbidity of the fluid, and other parameters, the appropriate geosynthetic fabric can be selected to meet the specific design requirements for a given fluid filtration project design.

Geosynthetic fabric may be prepared using one or a combination of various polymers, for example polyester, polypropylene, polyamides, and polyethylene. Most commercially available geosynthetic fabrics are polypropylene or polyester. Examples of suitable nonwoven geosynthetic fabrics include, but are not limited to, Propex 4508 and AMOPAVE polypropylene fabrics available from Propex Fabrics Inc. (Austell, Ga.); Geotex® nonwoven fabrics available from Propex, Inc. (Chattanooga, Tenn.); Typar®, a polypropylene fabric commercially available from Dupont; and TREVIRA® Spunbond, a polyester fabric commercially available from Hoechst Fibers Industries. Examples of suitable woven geosynthetic fabrics include, but are not limited to, Mirafi® Filterweave® woven geotextiles (Mirafi Construction Products, Pendergrass, Ga.), GTF series fabrics available from Linq Industrial Fabrics, Inc. (Summerville, S.C.); and Geotex® woven fabrics available from Propex, Inc. The geosynthetic fabrics are nonbiodegradable, so they do not deteriorate due to environmental exposure. During prolonged use, exposure to ultraviolet (UV) light may cause some geosynthetic fabrics to weaken or deteriorate. However, UV-resistant fabrics are commercially available, as are UV resistance treatment methods.

A preferred geosynthetic fabric for use on filter cartridges of the present invention is Mirafi® Filterweave® FW 402 (Mirafi Construction Products, Pendergrass, Ga.).

The flexible fabric material can be in the configuration of a bag (i.e., open at one end), a sleeve (i.e., open at two ends), or any other desired configuration. It at least one embodiment, the frame of the filter cartridge has a first side and a second side, and the sheet of flexible fabric material is in the configuration of a first panel and a second panel, the first panel being connected to the first side of the frame and the second panel being connected to the second side of the frame, thereby defining the internal zone.

In another embodiment, the flexible fabric material is multi-layered, with the multiple layers being formed of the same geosynthetic material or different geosynthetic materials. Thus, a woven geosynthetic material can be used in combination with a non-woven geosynthetic material, two or more different woven geosynthetic materials can be used, or two or more different non-woven geosynthetic materials can be used. The physical structure of the materials can also be modified to affect flow rates therethrough, as taught in U.S. Pat. No. 6,485,229 to Gunderson et al., issued Nov. 7, 2002, which is hereby incorporated by reference in its entirety.

The filter cartridge can also be equipped with a gas injection system that includes a source of compressed gas in fluid communication with at least one gas outlet in communication with the internal zone. A gas injection system of this type is disclosed in U.S. Pat. No. 6,485,229 to Gunderson et al., issued Nov. 7, 2002, which is hereby incorporated by reference in its entirety. The gas injection system can be used to clean the filter panels of sediments and remove impinging aquatic organisms to maintain adequate water flow. The bubbling action of the expanding air rising up through the filter panel layers shakes and cleans the filter fabric of any sediment and/or aquatic life that may be impinged thereon. (During cleaning, water filtration typically will not be occurring so that the injected air will be allowed to pass externally of the fabric material rather than exclusively into the internal zone.) The filter cartridge may also have a one-way gas vent, for example a one-way check valve, that has an inlet in fluid communication with the internal zone and an outlet located outside the internal zone, to reduce gas pressure within the internal zone during operation of the gas injection system. In filter cartridges in which the sheet of flexible fabric material is disposed on more than one side of the frame, there is preferably at least one gas outlet on each side. In embodiments with multi-layered flexible fabric material, the gas outlet(s) is(are) preferably located between the layers of flexible fabric material.

The flexible fabric material is preferably connected to the frame by bolting, clamps, fasteners, lacing, ties, or any other appropriate attachment method which allows its removal and replacement, if necessary. A plurality of such connections can be made.

In at least one embodiment, the frame is bordered by a housing member that has first and second clamp members attached thereto. The housing member may define a recess along an edge of the frame, which recess has an opening through which an edge of the flexible fabric material passes. The cartridge according to this embodiment may also have means for retaining the edge of the flexible fabric material between the two clamp members. Suitable retaining means include, e.g., a rod, positioned within the recess, that has a thickness greater than the dimension of the opening to the recess; one or more ties connected to the edge of the flexible fabric material; and combinations thereof. Examples of suitable retaining means are also disclosed in U.S. patent application Ser. No. 10/972,554, filed Oct. 25, 2004, which is hereby incorporated by reference in its entirety.

The filter cartridge may also have one or more support members attached to the frame. In a preferred embodiment, the one or more support members are located substantially within the internal zone. Suitable support members include, e.g., a plurality of support ribs, a plurality of support rods, one or more support screens, and combinations thereof. In a preferred embodiment, the support members include a plurality of support ribs positioned substantially parallel to one another, each being connected at its opposite ends to the frame, and a support screen positioned adjacent the plurality of support ribs. The one or more support members may also include a support screen positioned between the plurality of support ribs and the flexible fabric material. In this manner, the support screen can act to prevent the flexible fabric material from collapsing substantially into the internal zone. The support ribs and support rods are preferably steel, more preferably galvanized steel. Suitable support screens include wire mesh screens, which may be coated with epoxy on a surface likely to come in contact with the flexible fabric material.

Referring now to FIG. 2A, a filter cartridge 10 in accordance with one embodiment of the present invention is shown. The filter cartridge 10 includes a frame 12, a flexible fabric material 14, connectors 16, support members 18, and a gas injection system 20.

Figure 2C:
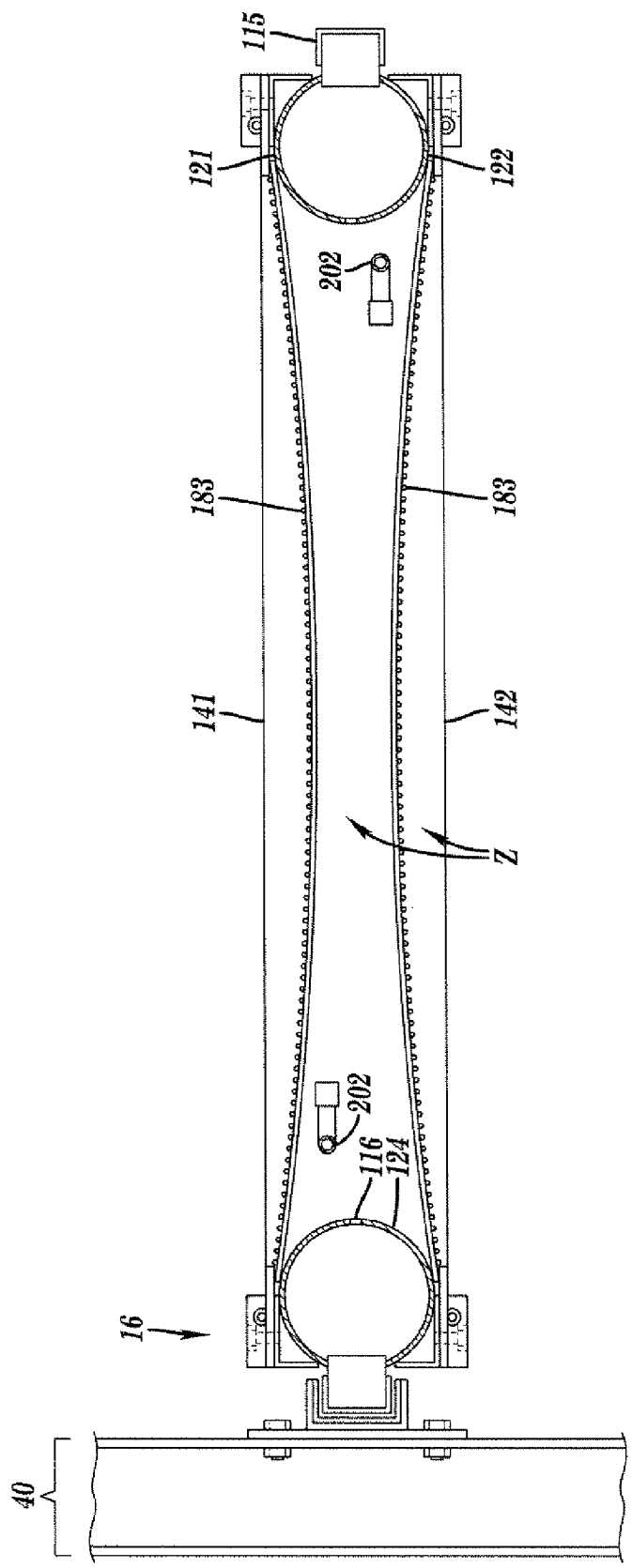
FIG. 2C is a cross-sectional, plan view of a filter system showing a filter cartridge of FIG. 2A along a line 2C-2C. In this embodiment, the frame is connected to a support. The housing member and first and second clamp members are also visible.
Figure 3C:
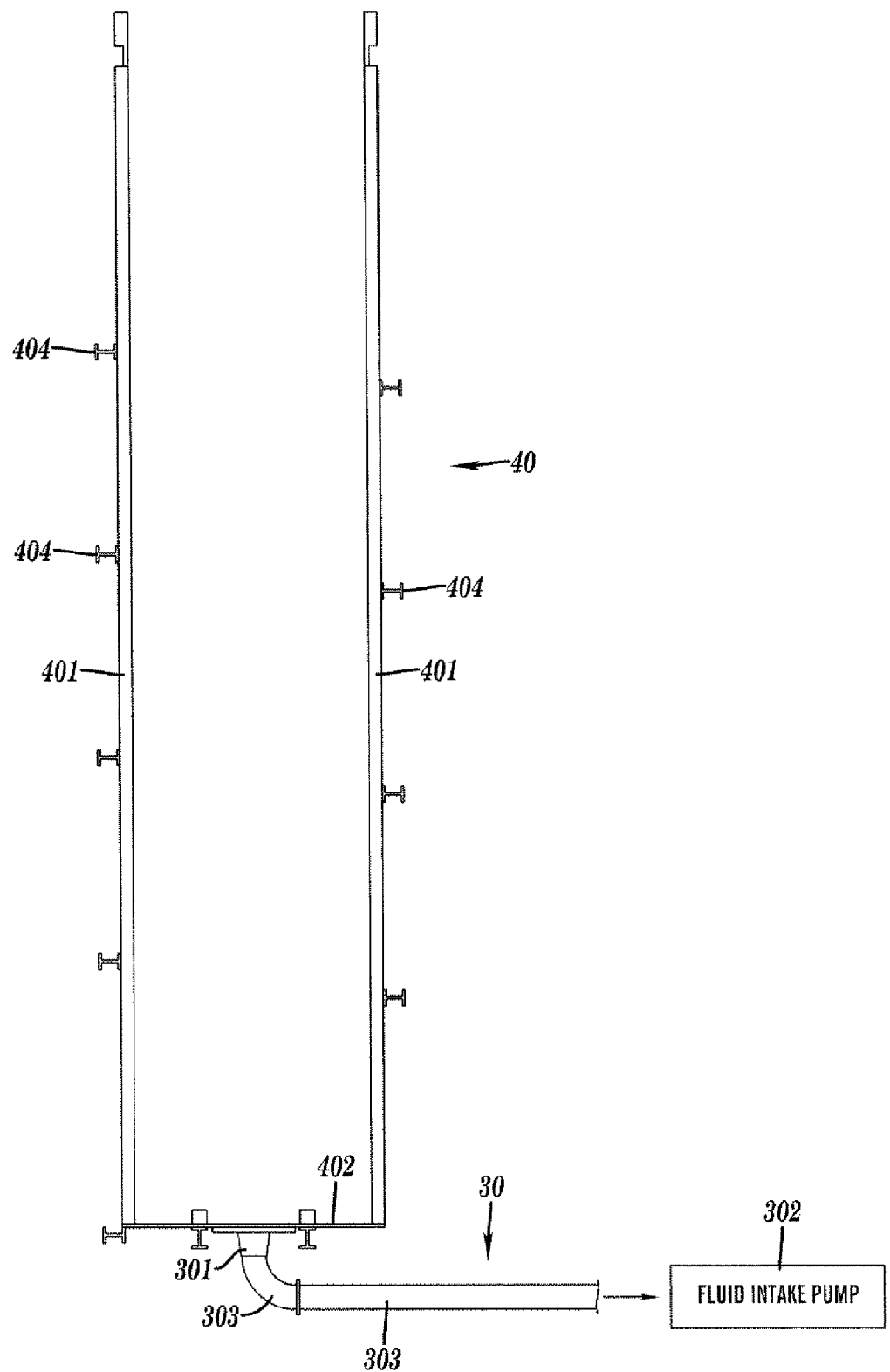
FIG. 3C is a detailed view of the filter cartridge guide channels.

As shown in FIGS. 2A-C, the frame 12 is formed of fluid conductive members 124 (e.g., round pipe) connected together as described above and nonconductive L-brackets 123 welded to the fluid conductive members, and has a fluid outlet 114, a plurality of spaced inlets 116, bumpers 115, and eye hooks 117 for ease of manipulating the filter cartridge 10. The flexible fabric material 14 is formed of a suitable geosynthetic material and is attached to frame 12 via a plurality of connectors 16. In this embodiment, the flexible fabric material 14 together with the frame 12 defines the internal zone Z.

In the embodiment shown in FIGS. 2A-C, the connectors 16 include first clamp members 161, and second clamp members 162. The first and second clamp members define a recess R through which an edge of the flexible fabric material 14 passes. In this embodiment the flexible fabric material 14 has a plurality of rods 118 disposed around its outer edge. The rods each have a thickness that is greater than the dimension of the opening to the recess R. Thus, in this embodiment, a rod 118 is disposed within the recess R defined by the first clamp member 161 and the second clamp member 162. The first clamp member 161 and second clamp member 162 are secured by means of a removable bolt 120 to L-bracket 123, thereby connecting the flexible fabric material 14 to the frame 12.

In this embodiment, as shown in FIG. 2C, the frame 12 has a first side 121 and a second side 122, and the flexible fabric material comprises a first panel 141 and a second panel 142. The first panel 141 and second panel 142 are attached to the first side 121 and second side 122 of the frame, respectively, via the connectors 16 as described above.

Support members 18 according to this embodiment include support rods 181, support ribs 182, and support screens 183. In this embodiment, a plurality of support rods 181 are positioned substantially parallel to one another along the length of the frame 12. A plurality of support ribs 182 are positioned substantially parallel to one another along the width of the frame 12, with their opposite ends either attached to the frame 12 or otherwise retained against the frame by connectors 16. Two support screens 183 are disposed on the side of the plurality of support rods 181 opposite to the plurality of support ribs 182. In this embodiment, the support screens 183 are attached to one or more of the support rods or support ribs via cable ties. As will be apparent to one of skill in the art, the support screens may be attached to the frame instead of or in addition to being attached to other support members, by any suitable means of attachment. For example, in this embodiment the support screen 183 is also connected to the frame by the first clamp member 161 (i.e., sandwiched between first clamp member 161 and the frame 12). The support members 18 in this embodiment are all located within the internal zone Z, but other configurations are contemplated.

In this embodiment, the gas injection system 20 includes an air hose port for connection to a source of compressed gas, such as a compressor. Perforated air supply pipes 202 in fluid communication with the air hose port are disposed within the filter cartridge 10 effectively to produce one or more gas outlets within the internal zone Z. Conduits connected to smaller diameter tubing that pass from the air hose port through the internal zone may optionally be provided effectively to produce one or more gas outlets within the internal zone.

The gas injection system 20 also includes a one-way gas vent 203 that allows air bubbles trapped in the internal zone Z to escape therefrom. The gas vent in this embodiment has an inlet 204 in communication with the internal zone Z an outlet 205 located outside the internal zone Z, and a one-way check valve responsive to the air pressure within the internal zone Z; thus, fluid will not normally flow through the gas vent 203. The gas vent 203 is typically only opened during operation of the gas injection system 20, which is used when filtration is not occurring.

The filter cartridge 10 is intended to be used in a system for filtering fluid intake, particularly water. This system includes a fluid intake system that has at least one inlet in fluid communication with a fluid intake pump, and at least one filter cartridge of the present invention, where the fluid outlet of the cartridge is in fluid communication with the at least one inlet.

In at least one embodiment, the system includes two or more inlets and two or more filter cartridges, with each inlet being in fluid communication with the fluid outlet on exactly one filter cartridge. The system may also have a support connected to the frame.

Referring now to FIGS. 3A-C and 4A-B, the filter cartridge 10 is connected to a fluid intake system 30. In particular, the fluid outlet 114 of the filter cartridge 10 is connected to an inlet 301 of the fluid intake system 30 that is in fluid communication with a fluid intake pump 302. Preferably, the outlet 114 is simply seated within inlet 301, and one or more ring gaskets ensure a sufficient seal. Once installed, operation of the fluid intake system will draw fluid (e.g., water) from outside the filter cartridge 10, through the flexible fabric material 14, and into the internal zone Z, thereby filtering the fluid. Filtered fluid is then drawn into the frame 12 through the plurality of spaced inlets 116 and, ultimately, into the fluid intake system 30.

This type of cartridge can be used in both high current conditions such as in oceans and rivers, and in low current conditions such as in lakes and ponds. When used in high current conditions, the cartridge is preferably positioned such that its widest profile is aligned with the current and lowest profile facing the current. The filter cartridge is secured in its desired location in a body of water, such that the water level is preferably below the top of the frame 12.

The filter cartridge(s) can be secured by means of a support structure (or cradle) 40 with several guides to ensure proper positioning of the frame 12. The support structure 40 includes lateral supports 401 attached on either side of a perpendicular base support 402. The lateral supports 401 and/or base support 402 are attachable to a lateral framework 404 (e.g., I-beams) anchored to a structure 405. The support structure 40 may also include spacers 406, e.g., to ensure proper spacing between cartridges when multiple cartridges 10 are used. As shown in FIG. 4B, in this embodiment the lateral supports 401 create a vertical channel, into which bumpers 115 disposed along the lateral edges of the filter cartridge 10 are received. Other configurations may be used, as will be apparent to the skilled artisan. In the embodiment shown, lateral framework 404 includes two series of I-beams disposed on distal sides of the lateral supports 401. One series of I-beams is attached to a wall 405 of a fluid intake system. A vertical sheet material (e.g., steel sheet) may be attached to the distal side of the other series of I-beams, thereby forming a channel in which the filter cartridges 10 lie. Other suitable means for securing the filter cartridge may be used, as will be apparent to the skilled artisan.

As shown in FIG. 4B, the filter cartridges can be lowered into the cradle by sliding bumpers 115 into the lateral supports 401 and lowering the filter cartridge. The filter cartridge can be lowered using, e.g., a crane having cables attached to the eye hooks 117 as shown. Removal of the filter cartridge can be achieved simply by lifting the cartridge in reverse manner.

Figure 4A:
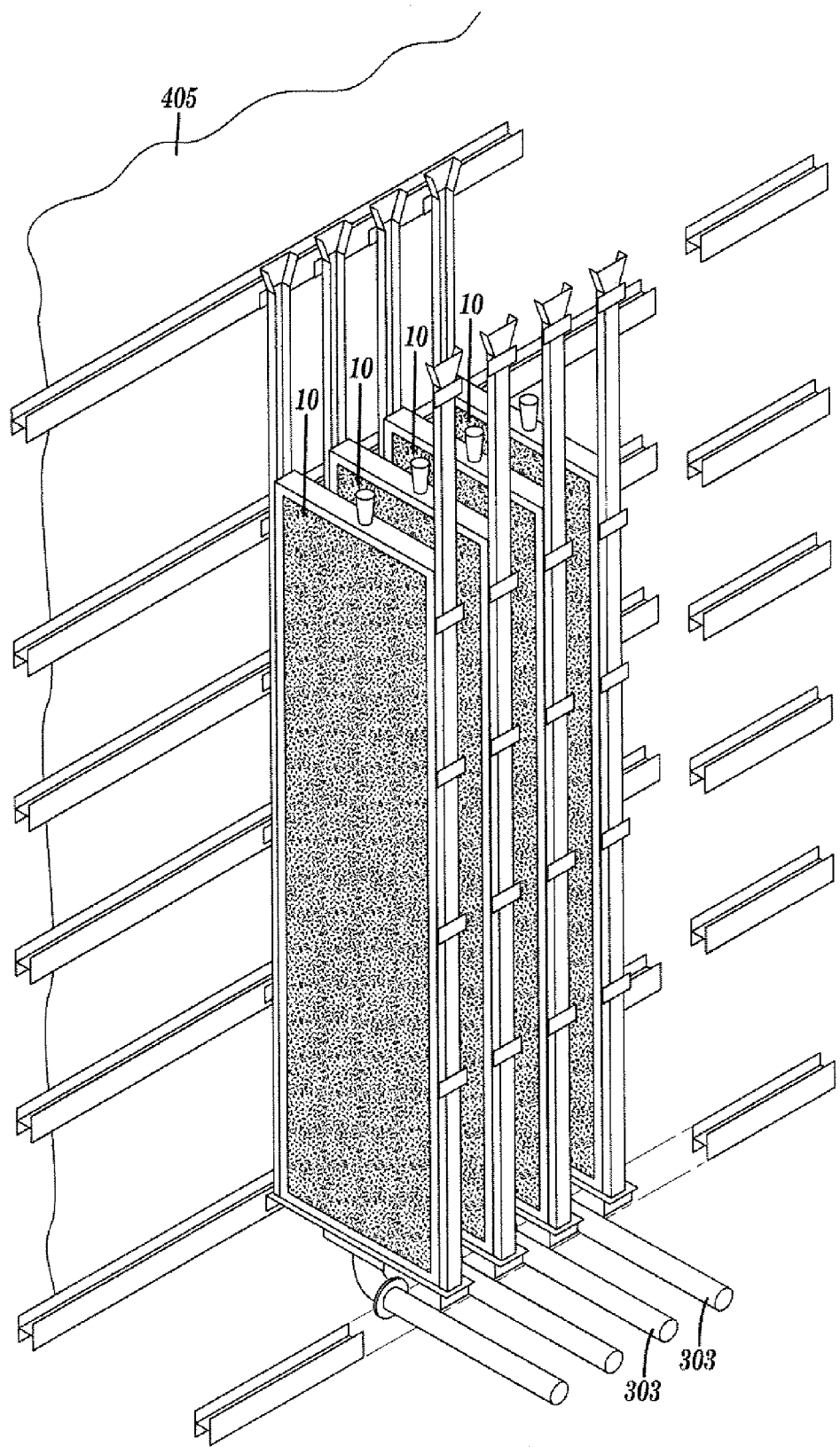
FIG. 4A is a perspective view showing four filter cartridges of the present invention installed parallel to one another. The horizontal supports are broken away from the foreground, and one is shown in partial phantom lines.
Figure 4B:
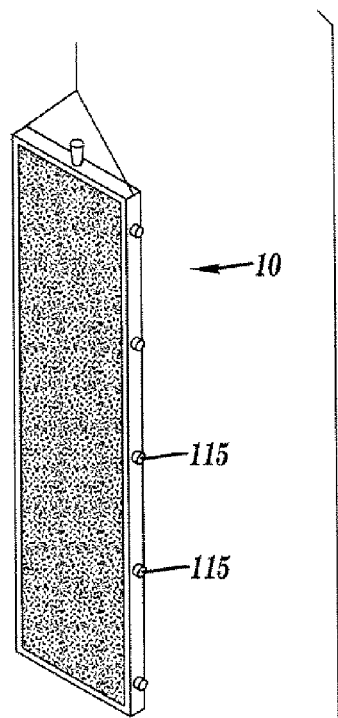
FIG. 4B is an exploded perspective view showing a method of installing a filter cartridge of the present invention. In this embodiment, the filter cartridge is slid longitudinally (in the direction of the arrows) into guide channels of the support system of FIG. 3A.
Figure 4B:
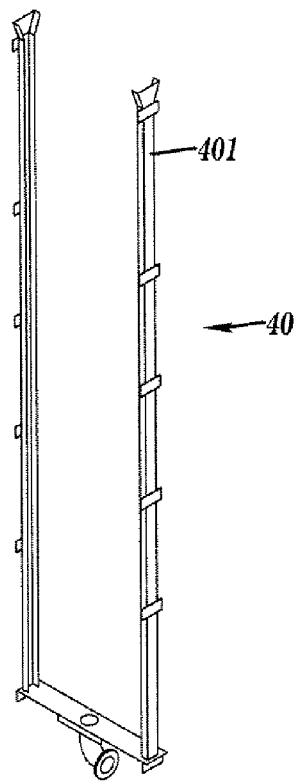
Figure 5:
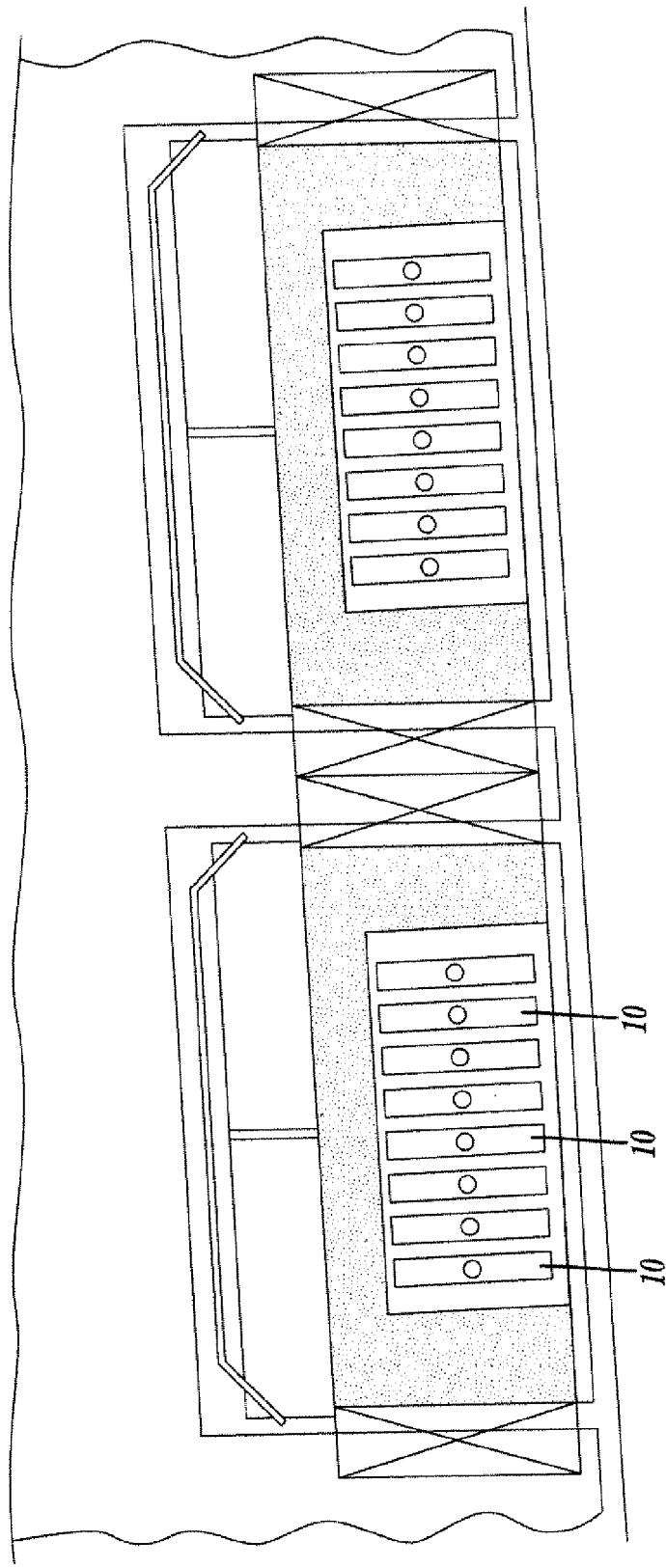
FIG. 5 is a plan view showing sixteen filter cartridges of the present invention installed in a water intake system. Two intake bays, each with eight cartridges, are shown.

As shown in FIGS. 4A-B and 5, multiple filter cartridges can be employed in combination with the fluid intake system. Valves can also be provided, allowing flow from a specific filter cartridge to be shut down individually.

The gas injection system 20 can be operated from time to time to clean impinging materials from the exterior of the filter cartridge 10 (i.e., from the flexible fabric material 14). To do so, it is desirable to cease drawing water through the inlet 301 of the fluid intake system 30. This will allow the air bubbles to expand the flexible fabric material 14 and cause fizzing of the air bubbles to remove the impinging materials.

In systems employing more than one filter cartridge, it is desirable to cease drawing fluid through the inlet in fluid communication with the fluid outlet of adjacent filter cartridges as well. An air diffuser system 50 can also optionally be employed in the fluid intake system 30, as shown in FIGS. 3A-B. In operation, the air diffuser system 50 diffuses air along the outside of the filter cartridges to move previously impinging materials away from the filter cartridges. For example, after gas injection system 20 is used to remove impinging material, air diffuser system 50 can be employed to create an upward current or swell to lift the removed material up and away from the filter cartridges 10. This will allow any current of the body of water to carry the materials away from the cartridges.

Fluid intake systems of the present invention may be modified as dictated by specific project design. For example, filter cartridge(s) of the present invention may be used in existing fluid intake systems with minor or major modification. Existing structures of the fluid intake system typically will dictate the placement of the filter cartridge(s). Connection of the inlet(s) of the fluid intake system to the fluid intake pump(s) typically include one more intake pipes 303. The placement, length, and diameter of the intake pipes is dictated by, e.g., shoreline contours, bottom contours, volume of fluid required, the existing structure of the fluid intake system, etc. Intake pipes are generally welded in place, and may be steel or any other appropriate material. They may extend horizontally, vertically, or any angle in between. The intake pipe(s) connected to each individual filter cartridge are also preferably equipped with a manual and/or automatic regulated valve that enables the intake pipe(s) to be closed or opened as desired (i.e., for service) without shutting down the entire fluid intake system. In embodiments using more than one filter cartridge 10 (e.g., FIGS. 4A and 5), the multiple intakes 303 may eventually merge into a single intake.

To replace a filter cartridge entirely or simply the flexible fabric material, i.e., after their useful life, the valve on the cartridge's respective intake pipe can be closed, allowing for removal of the filter cartridge and its immediate replacement with an alternate filter cartridge, or, its re-installation following repair of the one removed.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A filter cartridge for use in a fluid intake system, the filter cartridge comprising:
   a frame that is formed of one or more fluid conductive members and has a fluid outlet and a plurality of spaced inlets;
   a flexible fabric material that allows a flow of fluid therethrough, the flexible fabric material being connected to the frame in a manner defining an internal zone, whereby substantially all fluid entering the internal zone from an opposite side of the flexible fabric material passes therethrough;
   wherein the plurality of spaced inlets are located in the internal zone, and are positioned to allow the fluid to be drawn substantially uniformly through the flexible fabric material; and
   wherein, upon connection of the fluid outlet to the fluid intake system, fluid is drawn through the flexible fabric material into the internal zone, thereby filtering the fluid, and filtered fluid is drawn through the plurality of spaced inlets and the one or more fluid conductive members before passing to the fluid outlet for delivery into the fluid intake system.

2. The filter cartridge according to claim 1 wherein the frame has a closed shape.

3. The filter cartridge according to claim 1 wherein the frame has a first side and a second side, and the sheet of flexible fabric material comprises a first panel and a second panel, the first panel being connected to the first side of the frame and the second panel being connected to the second side of the frame, thereby defining the internal zone.

4. The filter cartridge according to claim 1 wherein the flexible fabric material is comprised of a geosynthetic fabric.

5. The filter cartridge according to claim 1 wherein the flexible fabric material is multi-layered.

6. The filter cartridge according to claim 5 wherein the multi-layered flexible fabric material comprises two layers of flexible fabric material.

7. The filter cartridge according to claim 1 wherein the flexible fabric material is removably connected to the frame.

8. The filter cartridge according to claim 7 further comprising:
   a plurality of connectors that removably connect the flexible fabric material to the frame.

9. The filter cartridge according to claim 1 wherein the frame is bordered by a housing member and first and second clamp members attached to the housing member.

10. The filter cartridge according to claim 9 wherein along an edge of the frame, the housing member and first clamp member define a recess having an opening through which an edge of the flexible fabric material passes.

11. The filter cartridge according to claim 10 further comprising:
    retaining means for retaining the edge of the flexible fabric material between the housing member and first clamp member.

12. The filter cartridge according to claim 11 wherein the retaining means comprises a rod positioned within the recess, the rod having a thickness that is greater than the dimension of the opening to the recess.

13. The filter cartridge according to claim 1 further comprising one or more support members connected to the frame.

14. The filter cartridge according to claim 13 wherein the one or more support members are located substantially within the internal zone.

15. The filter cartridge according to claim 13 wherein the one or more support members comprise a plurality of support ribs, support rods, a support screen, or combinations thereof.

16. The filter cartridge according to claim 15 wherein the one or more support members comprise a plurality of support ribs positioned substantially parallel to one another, with each being connected at its opposite ends to the frame, and a support screen positioned adjacent the plurality of support ribs.

17. The filter cartridge according to claim 16 wherein the support screen is positioned between the plurality of support ribs and the flexible fabric material.

18. The filter cartridge according to claim 1 further comprising a gas injection system comprising a source of compressed gas in fluid communication with at least one gas outlet in communication with the internal zone.

19. The filter cartridge according to claim 18 wherein the gas injection system comprises a plurality of gas outlets.

20. The filter cartridge according to claim 18 further comprising a one-way gas vent having an inlet in communication with the internal zone and an outlet located outside the internal zone.

21. The filter cartridge according to claim 20 wherein the one-way gas vent comprises a one-way check valve.

22. The filter cartridge according to claim 1, wherein the fluid is water.

23. A system for filtering fluid intake comprising:
a fluid intake system comprising at least one inlet in fluid communication with a fluid intake pump; and
at least one filter cartridge according to claim 1 with the fluid outlet in fluid communication with the at least one inlet.

24. The system according to claim 23, wherein the system comprises two or more inlets and two or more filter cartridges, with each inlet being in fluid communication with the fluid outlet on exactly one filter cartridge.

25. The system according to claim 23, further comprising a support structure that removably receives the frame.

26. The system according to claim 23, further comprising an air diffuser system disposed along at least one filter cartridge.

27. A method of filtering water entering a water intake system comprising:
installing a filter cartridge according to claim 1 into a water intake system with the fluid outlet in fluid communication with an inlet to the water intake system; and
drawing water through the water intake system, whereby water entering the water intake system is drawn through the sheet of flexible fabric material into the internal zone, thereby filtering the water, prior to passing through the fluid outlet for delivery into the water intake system.

28. The filter cartridge according to claim 1 wherein the dimensions of the plurality of spaced inlets are varied according to their proximity to the fluid outlet, with smaller dimension inlets being closer to the fluid outlet than larger dimensioned inlets.

* * * * *